United States Patent
Kim et al.

(10) Patent No.: US 10,686,503 B2
(45) Date of Patent: Jun. 16, 2020

(54) METHOD AND APPARATUS FOR REPORTING CHANNEL QUALITY INFORMATION FOR 3D MIMO IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Youngtae Kim, Seoul (KR); Hyunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/554,702

(22) PCT Filed: Jan. 11, 2016

(86) PCT No.: PCT/KR2016/000226
§ 371 (c)(1),
(2) Date: Aug. 30, 2017

(87) PCT Pub. No.: WO2016/143994
PCT Pub. Date: Sep. 15, 2016

(65) Prior Publication Data
US 2018/0069611 A1 Mar. 8, 2018

Related U.S. Application Data

(60) Provisional application No. 62/260,333, filed on Nov. 27, 2015, provisional application No. 62/130,564, filed on Mar. 9, 2015.

(51) Int. Cl.
*H04B 7/04* (2017.01)
*H04L 5/00* (2006.01)
(Continued)

(52) U.S. Cl.
CPC ......... *H04B 7/0617* (2013.01); *H04B 7/0478* (2013.01); *H04B 7/0626* (2013.01);
(Continued)

(58) Field of Classification Search
CPC ... H04B 7/0632; H04B 7/0695; H04B 7/0469
(Continued)

(56) References Cited

U.S. PATENT DOCUMENTS

2011/0149792 A1* 6/2011 Nakano ............... H04W 24/10
370/252
2013/0010722 A1* 1/2013 Suzuki ................ H04L 1/1854
370/329
(Continued)

FOREIGN PATENT DOCUMENTS

| CN | 101682387 | 3/2010 |
| EP | 2169846 | 3/2010 |

(Continued)

OTHER PUBLICATIONS

PCT International Application No. PCT/KR2016/000226, Notification of Transmittal of the International Search Report and the Written Opinion of the International Searching Authority, or Declaration dated Apr. 29, 2016, 10 pages.
(Continued)

*Primary Examiner* — Asad M Nawaz
*Assistant Examiner* — Jason A Harley
(74) *Attorney, Agent, or Firm* — Lee Hong Degerman Kang Waimey

(57) ABSTRACT

Disclosed herein a method of, at a user equipment (UE), reporting channel quality information for three-dimensional (3D) multiple input multiple output (MIMO) transmission to a base station in a wireless communication system The method includes receiving information for vertical cycling beamforming from the base station, calculating the channel
(Continued)

quality information using the information for the vertical cycling beamforming, on the assumption that different vertical beamforming is circularly applied in a predetermined resource unit to receive a downlink signal, and reporting the calculated channel quality information to the base station.

4 Claims, 12 Drawing Sheets

(51) Int. Cl.
| | |
|---|---|
| H04W 16/28 | (2009.01) |
| H01Q 21/24 | (2006.01) |
| H04W 40/00 | (2009.01) |
| H04B 7/06 | (2006.01) |
| H04B 7/0456 | (2017.01) |
| H04W 72/12 | (2009.01) |
| H04W 72/04 | (2009.01) |
| H04W 88/02 | (2009.01) |
| H04W 88/08 | (2009.01) |

(52) U.S. Cl.
CPC ......... *H04B 7/0632* (2013.01); *H04B 7/0639* (2013.01); *H04B 7/0645* (2013.01); *H04B 7/0695* (2013.01); *H04L 5/0025* (2013.01); *H04L 5/0048* (2013.01); *H04L 5/0057* (2013.01); *H04W 72/042* (2013.01); *H04W 72/046* (2013.01); *H04W 72/0446* (2013.01); *H04W 72/0453* (2013.01); *H04W 72/1289* (2013.01); *H04W 88/02* (2013.01); *H04W 88/08* (2013.01)

(58) Field of Classification Search
USPC ......................................................... 370/329
See application file for complete search history.

(56) References Cited

U.S. PATENT DOCUMENTS

| | | | | |
|---|---|---|---|---|
| 2013/0308715 A1* | 11/2013 | Nam | ..................... | H04B 7/0469 375/267 |
| 2014/0011468 A1* | 1/2014 | Park | ..................... | H04B 7/0802 455/272 |
| 2014/0016549 A1* | 1/2014 | Novlan | ................ | H04B 7/0417 370/328 |
| 2014/0098689 A1* | 4/2014 | Lee | ....................... | H04B 7/0469 370/252 |
| 2014/0241274 A1* | 8/2014 | Lee | ....................... | H04L 5/0048 370/329 |
| 2014/0355707 A1* | 12/2014 | Kim | ..................... | H04B 7/0469 375/267 |
| 2015/0124688 A1* | 5/2015 | Xu | ........................ | H04B 7/0452 370/312 |
| 2016/0345300 A1* | 11/2016 | Kim | ..................... | H04W 48/16 |

FOREIGN PATENT DOCUMENTS

| | | |
|---|---|---|
| WO | 2014052806 | 4/2014 |
| WO | 2014190903 | 12/2014 |

OTHER PUBLICATIONS

CATR, "Consideration on open loop transmission for FD-MIMO", 3GPP TSG RAN WG1 Meeting #80, R1-150598, Feb. 2015, 2 pages.
LG Electronics, "Discussion on OL-MIMO and channel reciprocity based operations", 3GPP TSG RAN WG1 Meeting #80, R1-150226, Feb. 2015, 2 pages.
Intel, "UERS Based Diversity Transmission for Large Antenna Array", 3GPP TSG RAN WG1 Meeting #80, R1-150240, Feb. 2015, 3 pages.
European Patent Office Application Serial No. 16761881.8, Search Report dated Sep. 20, 2018, 7 pages.
The State Intellectual Property Office of the People's Republic of China Application Serial No. 201680014335.6, Office Action dated Jan. 7, 2020, 6 pages.

* cited by examiner

FIG. 2
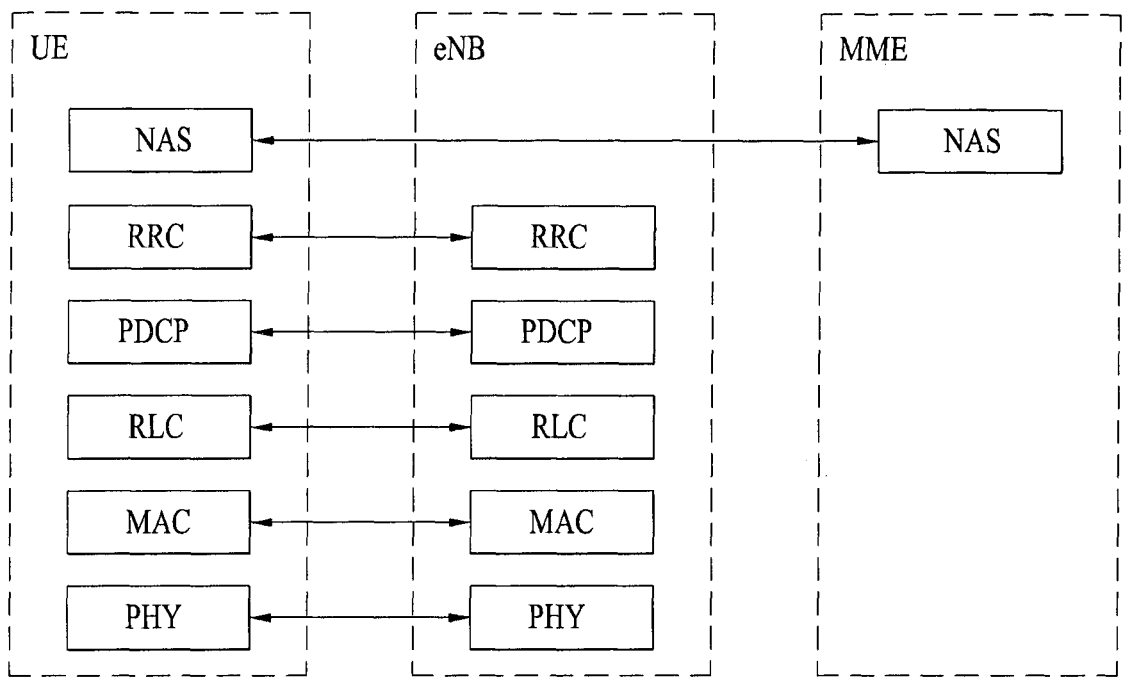
(A) CONTROL-PLANE PROTOCOL STACK
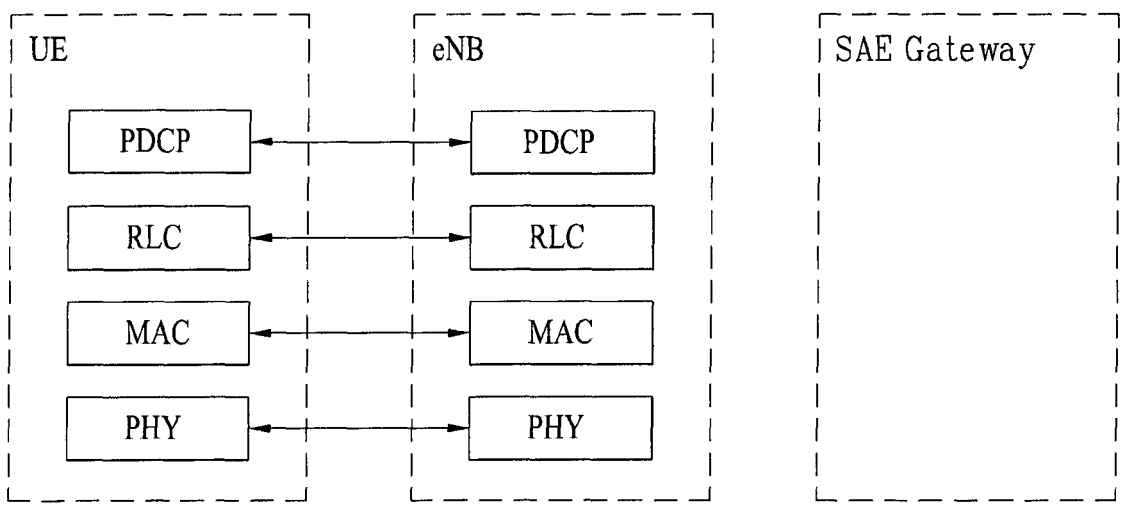
(B) USER-PLANE PROTOCOL STACK Block A Block B FIG. 10
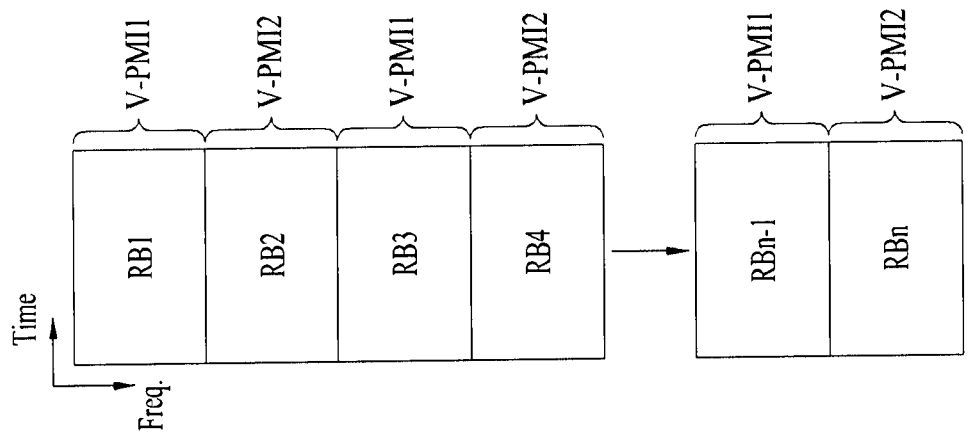
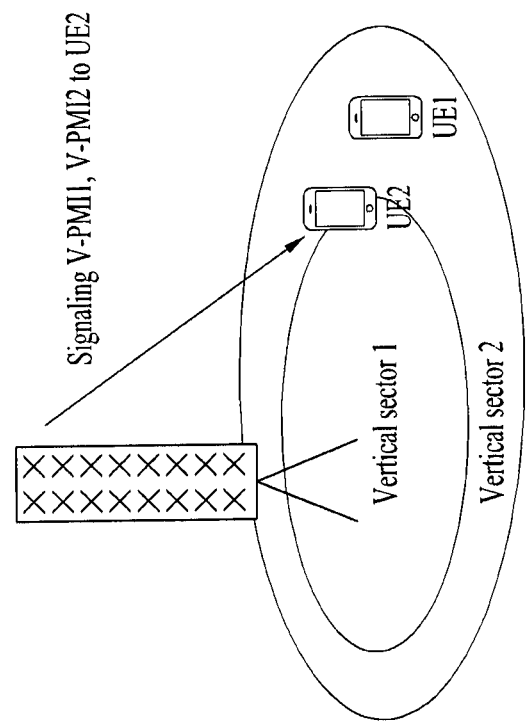

FIG. 11
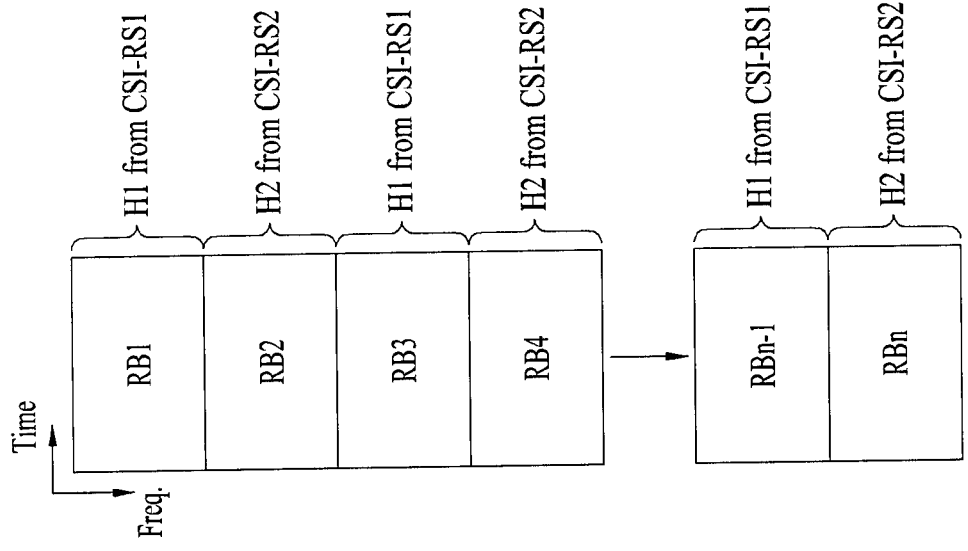
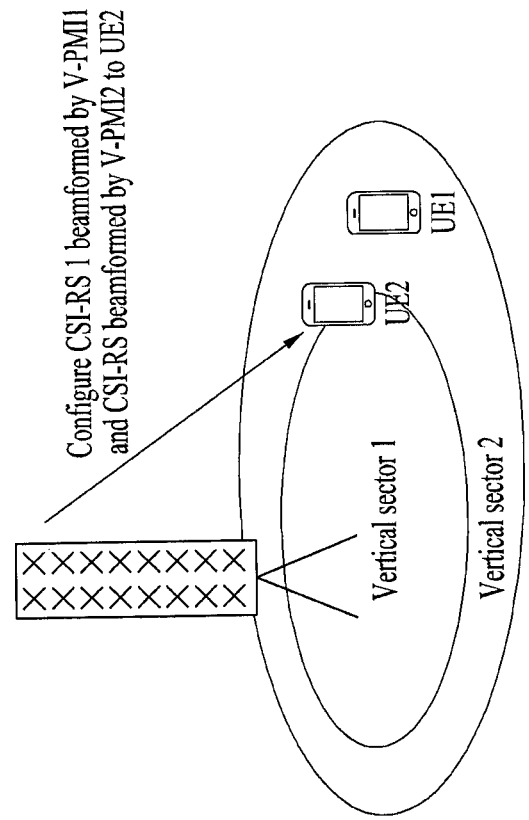

FIG. 12
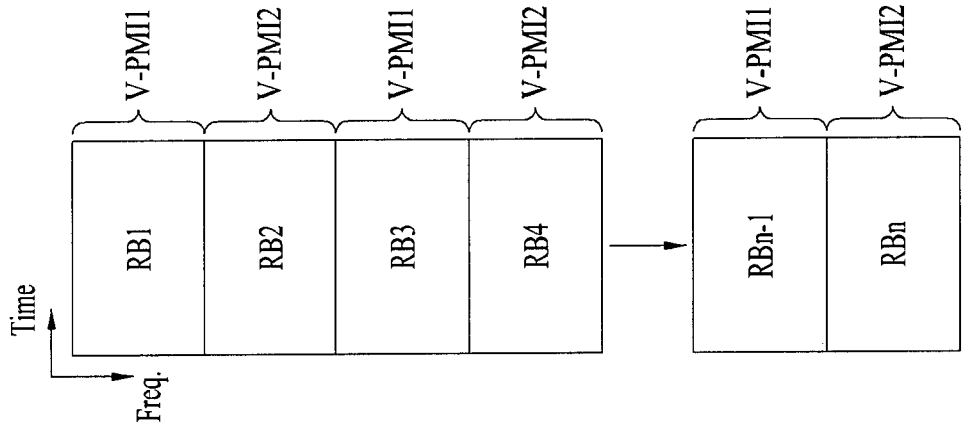
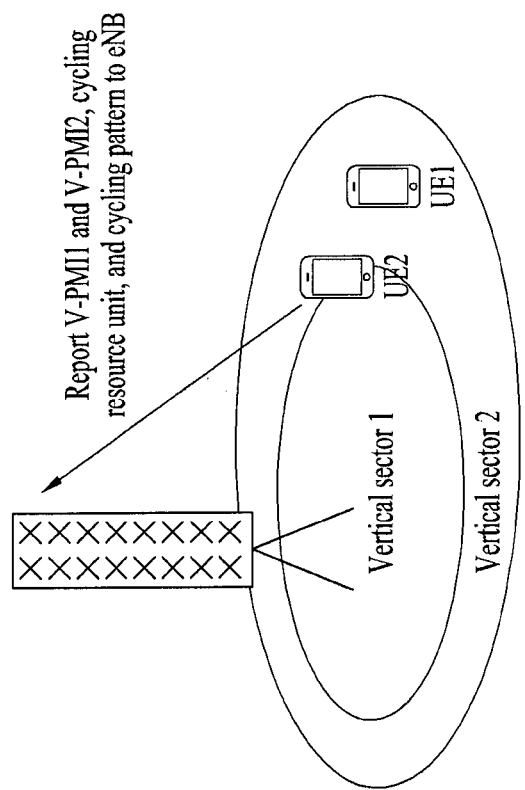

METHOD AND APPARATUS FOR REPORTING CHANNEL QUALITY INFORMATION FOR 3D MIMO IN WIRELESS COMMUNICATION SYSTEM

CROSS-REFERENCE TO RELATED APPLICATIONS

This application is the National Stage filing under 35 U.S.C. 371 of International Application No. PCT/KR2016/000226, filed on Jan. 11, 2016, which claims the benefit of U.S. Provisional Application Nos. 62/260,333 filed on Nov. 27, 2015, and 62/130,564 filed on Mar. 9, 2015, the contents of which are all hereby incorporated by reference herein in their entirety.

TECHNICAL FIELD

The present invention relates to a wireless communication system and, more particularly, to a method and apparatus for reporting channel quality information for three-dimensional (3D) multiple input multiple output (MIMO) in a wireless communication system.

Background Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention devised to solve the problem lies on a method and apparatus for reporting channel quality information for three-dimensional (3D) multiple input multiple output (MIMO) in a wireless communication system.

Technical Solution

The object of the present invention can be achieved by providing method of, at a user equipment (UE), reporting channel quality information for three-dimensional (3D) multiple input multiple output (MIMO) transmission to a base station in a wireless communication system including receiving information for vertical cycling beamforming from the base station; calculating the channel quality information using the information for the vertical cycling beamforming, on the assumption that different vertical beamforming is circularly applied in a predetermined resource unit to receive a downlink signal; and reporting the calculated channel quality information to the base station.

In another aspect of the present invention, provided herein is a user equipment (UE) in a wireless communication system including a wireless communication module configured to transmit and receive a signal to and from a base station and a processor configured to process the signal, wherein the processor controls the wireless communication module to calculate the channel quality information using information for the vertical cycling beamforming received from the base station, on the assumption that different vertical beamforming is circularly applied in a predetermined resource unit to receive a downlink signal, and to report the calculated channel quality information to the base station.

In the embodiments of the present invention, the information for the vertical cycling beamforming may include two or more vertical precoding matrix indices or two or more pieces of reference signal configuration information to which different vertical beamforming is applied.

The information for the vertical cycling beamforming may include information on the predetermined resource unit. The predetermined resource unit may be one or more resource element units The calculating the channel quality information may include calculating the channel quality information, on the assumption that different vertical beamforming is circularly applied in the predetermined resource unit and different horizontal beamforming is circularly applied to receive a downlink signal.

Advantageous Effects

According to the embodiments of the present invention, it is possible to efficiently calculate channel quality information for 3D MIMO in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a UE and an E-UTRAN based on the 3GPP radio access network specification;

FIG. 10 is a diagram showing an example of circularly applying vertical PMIs upon calculating a CQI according to a first embodiment of the present invention;

FIG. 11 is a diagram showing an example of using a beamformed CSI-RS upon calculating a CQI according to a second embodiment of the present invention;

FIG. 12 is a diagram showing an example in which a UE performs feedback to an eNB for vertical precoder cycling;

BEST MODE

Figure 1:
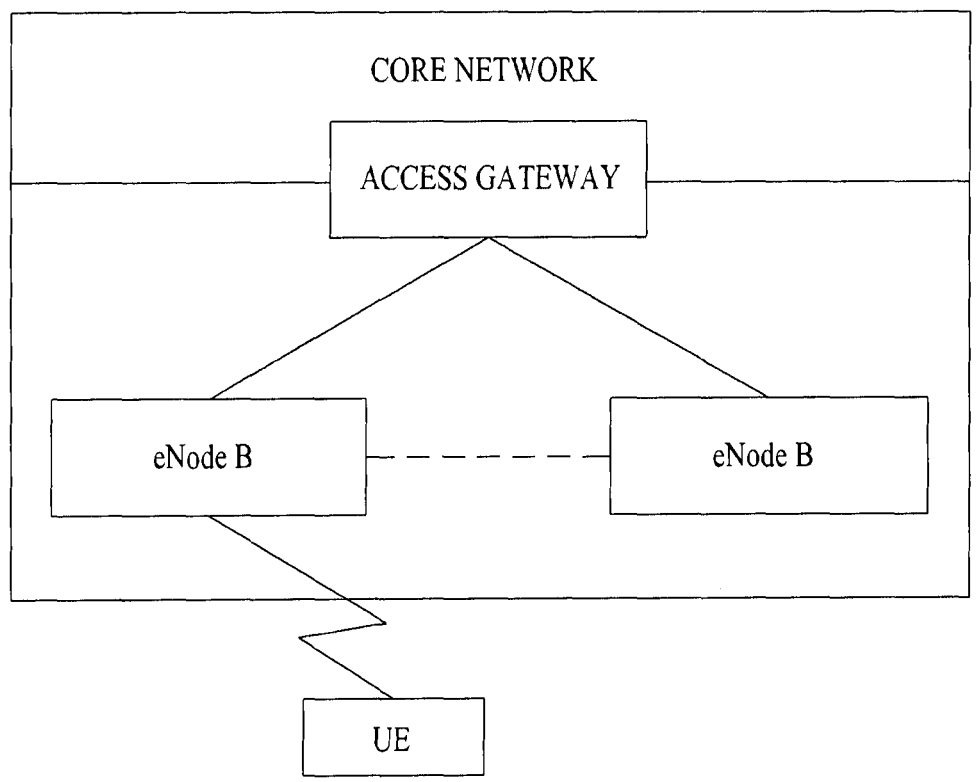
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
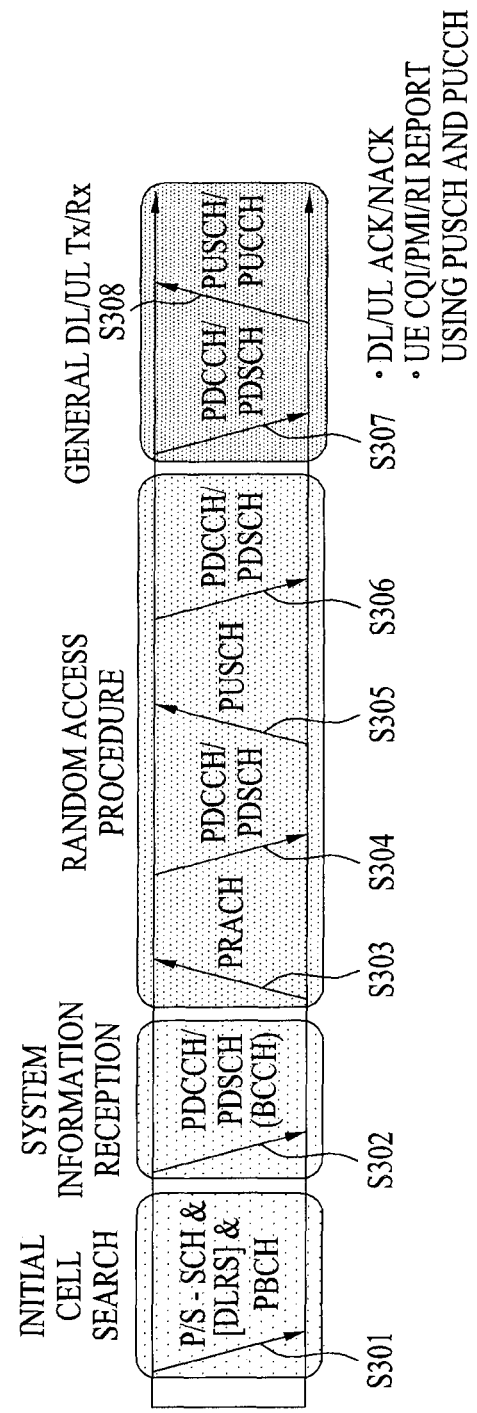
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
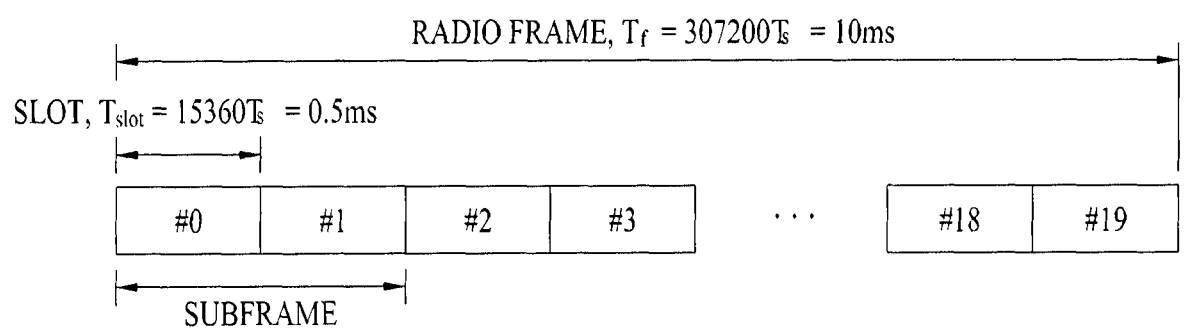
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz×2048) =3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
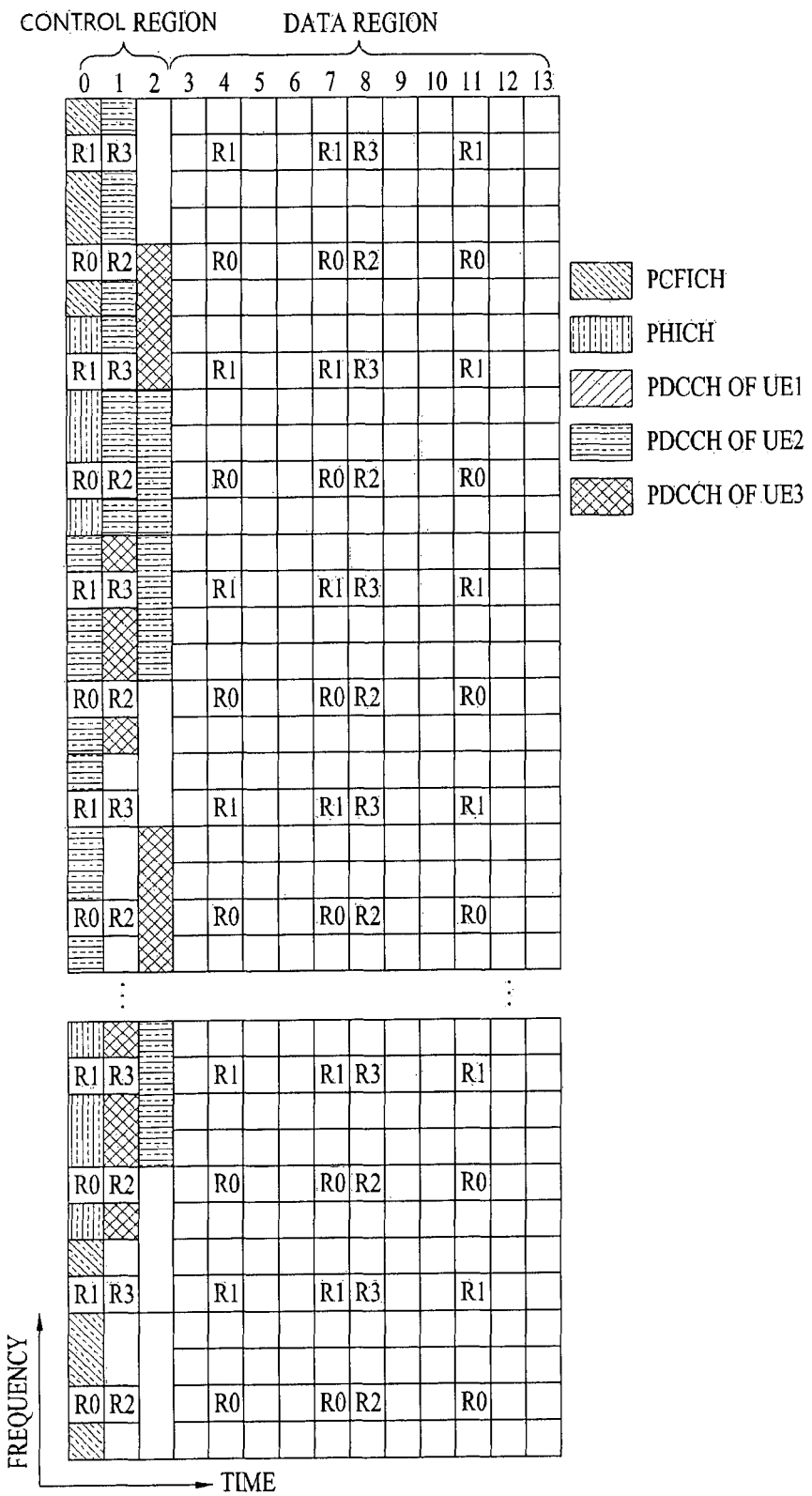
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
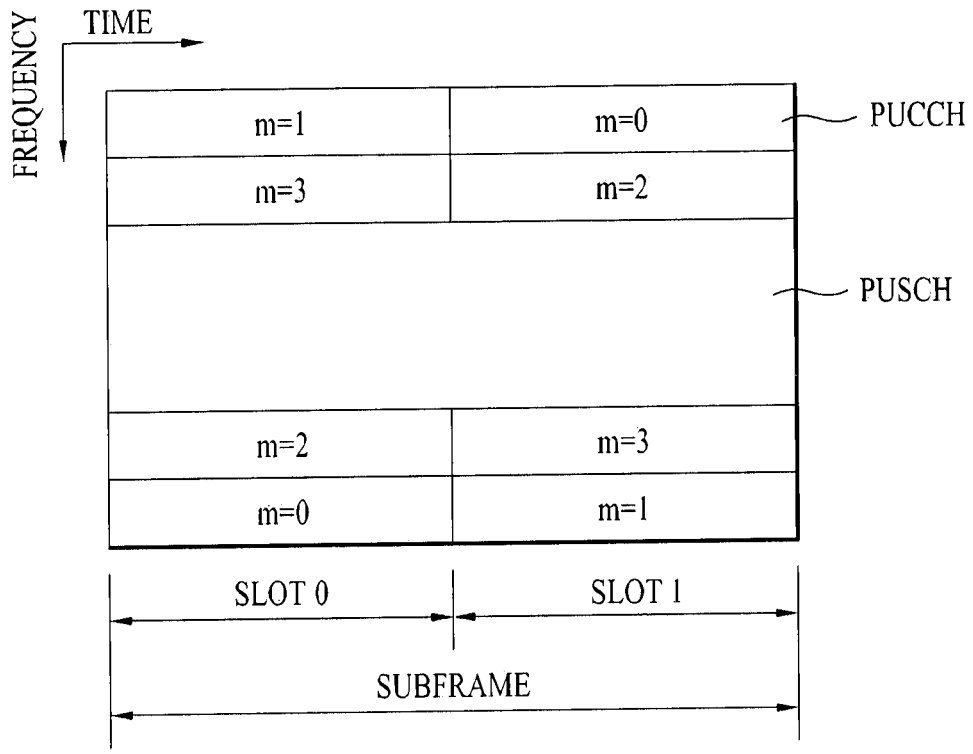
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
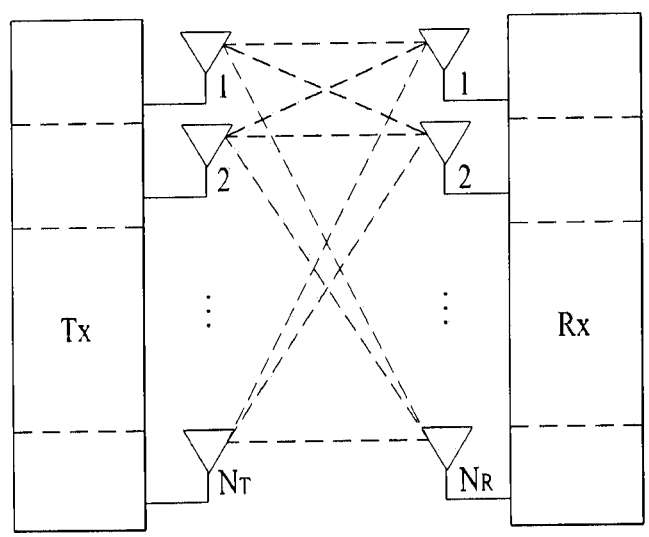
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \hat{s}_{N_T}]^T = [P_1 s_1, P_2 s_2, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & 0 \\ & P_2 & \\ 0 & & P_{N_T} \end{bmatrix} \begin{bmatrix} s_1 \\ s_2 \\ s_{N_T} \end{bmatrix} = Ps \quad \text{[Equation 4]}$$

Meanwhile, NT transmission signals $s_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ x_i \\ x_{N_T} \end{bmatrix} = \begin{bmatrix} w_{11} & w_{12} & w_{1N_T} \\ w_{21} & w_{22} & w_{2N_T} \\ w_{i1} & w_{i2} & w_{iN_T} \\ w_{N_T 1} & w_{N_T 2} & w_{N_T N_T} \end{bmatrix} \begin{bmatrix} \hat{s}_1 \\ \hat{s}_2 \\ \hat{s}_j \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \qquad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

A DM-RS which is a dedicated reference signal is supported for PDSCH transmission and is transmitted on antenna port(s) p=5, p=7, p=8 or p=7, 8, ..., υ+6 (where, υ is the number of layers used for PDSCH transmission). The DM-RS exists when PDSCH transmission is associated with the antenna port and is a valid reference only for PDSCH demodulation. The DM-RS is transmitted only on RBs to which the PDSCHs are mapped.

That is, the DM-RS is configured to be transmitted only on RBs, to which the PDSCHs are mapped, in a subframe in which the PDSCHs are scheduled, unlike a CRS configured to be transmitted in every subframe regardless of presence/absence of the PDSCH. In addition, the DM-RS is transmitted only via antenna port(s) corresponding to layer(s) of the PDSCHs, unlike the CRS transmitted via all antenna port(s) regardless of the number of layers of the PDSCHs. Accordingly, overhead of the RS may be reduced as compared to the CRS.

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and instructs the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
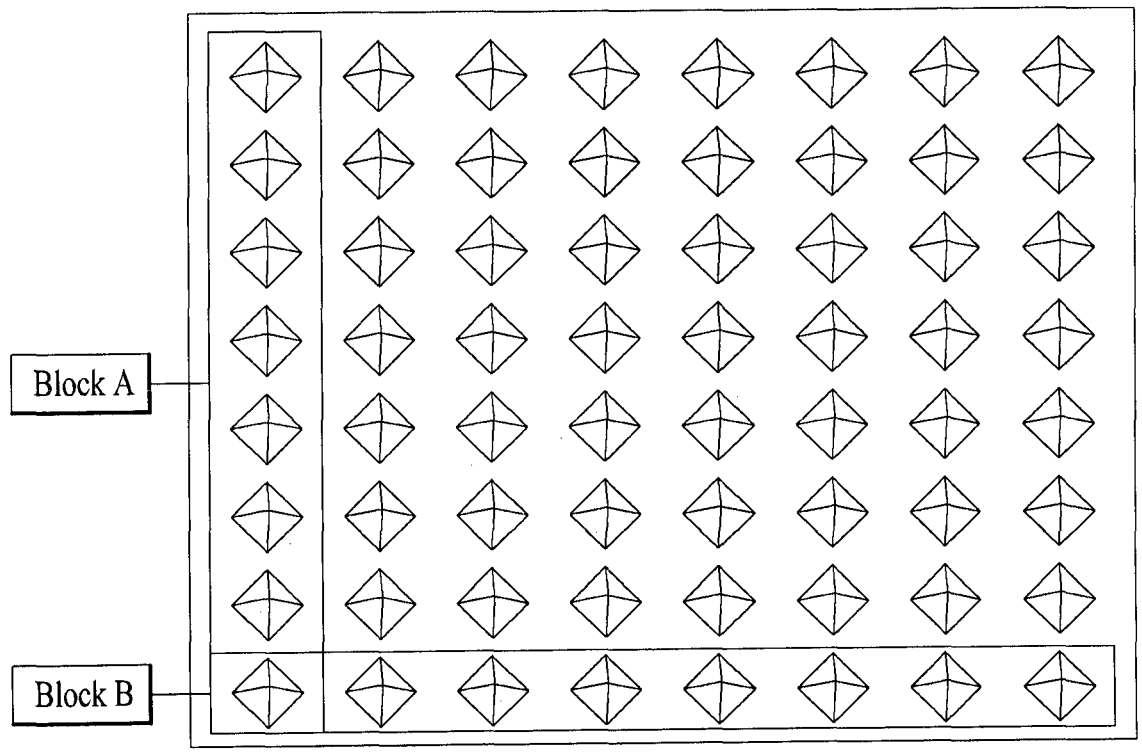
FIG. 8 illustrates an example of implementation of the 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is established by mounting a large number of antennas in vertical and horizontal directions.

The present invention relates to a CSI feedback method when a large delay-cyclic delay diversity (LD-CDD) transmission scheme is used based on a DM-RS. In the 2D AAS, as the number of transmit antennas in the eNB increases, a DM-RS based LD-CDD transmission scheme may be introduced, such that the LD-CDD scheme also supports rank 5 or higher. In this case, the present invention proposes a CSI feedback method upon applying the DM-RS based LD-CDD transmission scheme and a PRB bundling scheme of a UE upon applying the DM-RS based LD-CDD transmission scheme.

Prior to the description of the present invention, the LD-CDD scheme of the current LTE system will be described. Currently, in the LTE system, the LD-CDD scheme is defined as shown in Equation 8 below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \qquad \text{[Equation 8]}$$

In Equation 8, $x(i)=[x^{(0)}(i) \; x^{(v-1)}(i)]^T$ denotes a data symbol vector, to which precoding is not applied, and $y(i)=[y^{(0)}(i) \; y^{(P-1)}(i)]^T$ denotes a transmitted signal vector, to which precoding is applied. In addition, v and P denote the number of transmission layers and the number of antenna ports, respectively. In addition, in Equation 8, W(i) means a precoding matrix for adjusting a channel. Accordingly, an appropriate codeword may be selected and used from a codebook according to channel change.

However, currently, in the LD-CDD scheme of the LTE system, the codeword is not selected for use according to channel state. W(i) used in the LTE system is shown in Equation 9 below.

$$\begin{cases} W(i) = C_1 & \text{for 2 antenna ports} \\ W(i) = C_k, & \\ k = \left(\left\lfloor \dfrac{i}{\upsilon}\right\rfloor \bmod 4\right) + 1 \in \{1, 2, 3, 4\} & \text{for 4 antenna ports} \end{cases}$$ [Equation 9]

In Equation 9, $C_k$ denotes a codeword. With a fixed value or a value having a constant pattern, W(i) corresponds to the changed channel.

In contrast, in Equation 8, D(i) and U serve to mix all transmission layers in a domain to distribute signals of a layer domain in all virtual antennas with the same ratio. Thus, all layers have the same channel quality. Averaging the layers serves to reduce signal overhead. For example, when a linear minimum mean square error (MMSE) scheme is used in a receiver, only one CQI may be fed back and individual HARQ retransmission is not required for different layers, thereby reducing downlink control signaling. Currently, D(i) and U used in the LTE system are defined as shown in Table 4 below.

TABLE 4

| Number of layers $\upsilon$ | U | D(i) |
|---|---|---|
| 2 | $\dfrac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\dfrac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\dfrac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Generalization of the LD-CDD system will now be described. In Equation 8, W(i) is defined as a precoder related to a channel, U is generalized to a unitary matrix, and D(i) is generalized to a diagonal matrix in which diagonal terms have the same magnitude and a phase difference as shown in FIG. 10 below.

$$D(i) = \begin{bmatrix} 1 & 0 & L & 0 \\ 0 & e^{j\theta_{1,i}} & L & 0 \\ M & M & 0 & 0 \\ 0 & 0 & 0 & e^{j\theta_{\upsilon-1,i}} \end{bmatrix}$$ [Equation 10]

Referring to Equation 10, D(i) performs phase shift according to frequency. When the generalized W(i), D(i) and U are inserted into Equation 8, all layers are subjected to beamforming changed according to frequency by D(i) and U. More specifically, a covariance matrix of a transmission vector Y is calculated as shown in Equation 11 below.

$$R_{yy}^{(i)} = E\overline{y}(i)(y(i))^H = W(i)D(i)UU^H(D(i))^H(W(i))$$
$$H = W(i)(W(i))^H$$ [Equation 11]

If it is assumed that W(i) is used for a precoder for increasing channel gain by maximally using a high eigenvalue of the channel, in Equation 11, D(i) and U concentrate on averaging the channel quality of all layers while preserving such channel gain, because D(i) and U do not change the covariance matrix of the transmission vector.

As described above, when 2D-AAS is established in an eNB, vertical antennas are also installed. When an existing LD-CDD method obtains diversity gain while exchanging the horizontal beams, the 2D-AAS eNB preferably changes the vertical beams in order to obtain large diversity gain. Accordingly, recently, an LD-CDD method for changing the vertical beams was proposed.

However, the LD-CDD method for changing the vertical beams has one problem. Fundamentally, in the LD-CDD method of the current LTE system, the eNB and the UE know the precoder shown in Equation 8 in advance. In addition, the eNB notifies the UE of channels from horizontal antenna ports to the UE via the CRS for the horizontal antenna port and the UE applies the precoder to the channel found using the CRS to find a final channel Here, when the eNB, which has installed the 2D-AAS, changes and uses the precoder for the vertical beams, CRS ports corresponding in number to the total number of antenna ports of the eNB are necessary. However, currently, since the CRS is defined by four antenna ports, a DM-RS based LD-CDD scheme was proposed. Currently, according to the LTE standard, using the DM-RS, LD-CDD transmission through up to eight layers may be possible.

More specifically, the DM-RS based LD-CDD scheme may be configured as shown in Equations 12 and 13 below.

$$\begin{bmatrix} y^{(0)}(i) \\ \vdots \\ y^{(P-1)}(i) \end{bmatrix} = W(i_{RB}) \begin{bmatrix} x^{(0)}(i) \\ \vdots \\ x^{(\upsilon-1)}(i) \end{bmatrix}$$ [Equation 12]

$$\begin{bmatrix} y^{(0)}(i) \\ \vdots \\ y^{(P-1)}(i) \end{bmatrix} = W(i_{RB})D(i)U \begin{bmatrix} x^{(0)}(i) \\ \vdots \\ x^{(\upsilon-1)}(i) \end{bmatrix}$$ [Equation 13]

First, as shown in Equation 12, D(i) is not applied to $r(i)=[r^{(0)}(i) \; r^{(\upsilon-1)}(i)]^T$ which is a DM-RS sequence vector and $W(i_{RB})$ is applied to each RB or bundled RBs. Here, $W(i_{RB})$ may be changed to a fixed value or a constant pattern according to RB or bundled RBs. In contrast, in a data symbol for a PDSCH, as shown in Equation 13, $W(i_{RB})$, D(i) and U are all applied.

Figure 9:
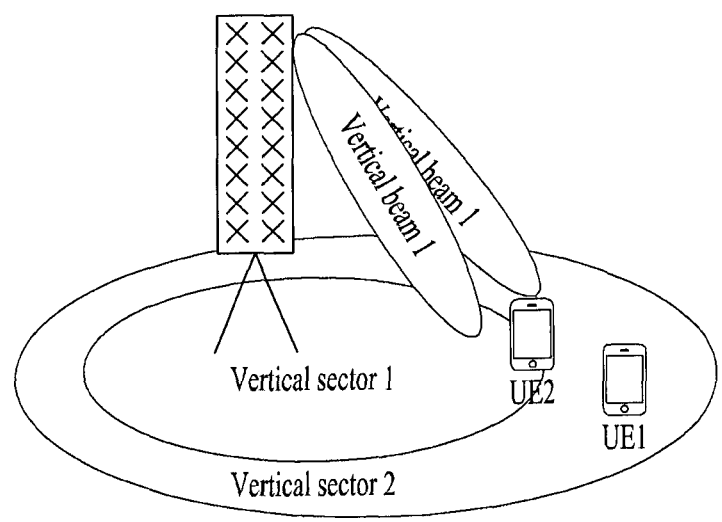
FIG. 9 is a diagram an example in which an eNB having a two-dimensional (2D) active antenna system (AAS) manages downlink communication via two vertical beams.

FIG. 9 shows an example in which an eNB having a 2D AAS manages downlink communication via two vertical beams.

In particular, in FIG. 9, UE1 is located at a vertical sector 2 and receives a signal having a high intensity from a vertical beam 2 rather than from a vertical beam 1. In contrast, UE2 is located at a boundary between the two vertical sectors and may receive signals having similar intensities from the vertical beam 1 and the vertical beam 2. When the speeds of UE1 and UE2 are high, performance of existing closed loop MIMO transmission depending on PMI feedback may significantly deteriorate due to channel aging and thus open loop MIMO transmission without PMI feedback may be appropriately performed.

When the DM-RS based LD-CDD, which is an open loop MIMO scheme, is applied, the precoder cycling methods of UE1 and UE2 may have the following differences. In case of the PDSCH of UE1, since the intensity of the vertical beam 1 is high, the vertical beam may not cycle in RE/RB/PRG units but may be fixed to the vertical beam 1 and the horizontal beam may cycle in RE/RB/PRG units to obtain diversity gain. In contrast, in case of the PDSCH of UE2, since the intensities of the vertical beam 1 and the vertical beam 2 are similar, the vertical beam may cycle RE/RB/PRG units and the horizontal beam may also cycle RE/RB/PRG units to obtain diversity gain.

The present invention proposes a CQI calculation method of a UE when applying an LD CDD to a UE located at a boundary between vertical sectors, such as UE2.

First Embodiment

FIG. 10 is a diagram showing an example of circularly applying vertical PMIs upon calculating a CQI according to a first embodiment of the present invention.

In the first embodiment of the present invention, an eNB notifies a UE of a vertical precoder (e.g., V-PMI) which will cycle in LD-CDD transmission. The V-PMI is transmitted via higher layer signaling such as RRC signaling or is dynamically transmitted via DCI, etc. The UE estimates a channel via a CSI-RS and then calculates a CQI obtained when alternately applying the V-PMI per RB as shown in FIG. 10.

In FIG. 10, since UE2 is located between vertical sectors, the eNB notifies the UE of two PMIs, that is, V-PMI1 and V-PMI2. When the number of signaled V-PMIs is N, the V-PMIs cycle starting from V-PMI1 in units of N RBs. In this example, since N=2, V-PMI1 and V-PMI2 repeatedly cycle in units of 2 RBs. Alternatively, the V-PMIs may cycle in units of RBs configuring a subband. In this case, the V-PMIs may cycle in units of N RBs configuring one subband. Alternatively, the V-PMIs may cycle in PRG units which are PRB bundling units. In this case, the V-PMIs may cycle again starting from V-PMI1 in units of N PRGs.

If the cycling unit of the V-PMIs is an RB and only one RB is scheduled to the UE, the V-PMIs do not cycle and thus diversity gain cannot be obtained using the vertical beam. Accordingly, when only one RB is scheduled to the UE, the V-PMIs efficiently cycle in units of n REs, where the RE is smaller than the RB. The UE calculates a CQI which may be obtained when alternately applying V-PMIs in units of n REs.

Second Embodiment

FIG. 11 is a diagram showing an example of using a beamformed CSI-RS upon calculating a CQI according to a second embodiment of the present invention.

In the second embodiment of the present invention, an eNB may not directly notify a UE of a vertical precoder (e.g., V-PMI) which will cycle in LD-CDD transmission but may notify the UE of the vertical precoder using a beamformed CSI-RS. In FIG. 11, the eNB configures CSI-RS1 beamformed by V-PMI1 and CSI-RS2 beamformed by V-PMI2 with respect to UE2 and UE2 performs channel estimation using different CSI-RSs per RB upon calculating the CQI. That is, UE2 calculates a channel H1 estimated using CSI-RS1 and a channel H2 estimated using CSI-RS2, assumes a channel H1 with respect to a specific RB, assumes a channel H2 with respect to another specific RB, and calculates CQI.

Although the UE circulates the V-PMIs in RB units in the first embodiment, in the second embodiment, the UE performs cycling of a plurality of channels, to which different V-PMIs are already applied, and calculates a CQI. When the number of signaled CSI-RSs is N, cycling is performed starting from H1 in units of N RBs. In this example, since N=2, H1 and H2 repeatedly cycle in units of 2 RBs. Alternatively, the channels may cycle in units of RBs configuring a subband. In this case, cycling may be performed starting from H1 in units of N RBs configuring one subband. Alternatively, the channel may cycle in PRG units which are PRB bundling units. In this case, cycling is performed starting from H1 in units of N PRGs.

If a channel cycling unit is an RB and only one RB is scheduled to the UE, V-PMI cycling is not applied and thus diversity gain cannot be obtained using the vertical beam. Accordingly, when only one RB is scheduled to the UE, the V-PMIs efficiently cycle in units of n REs, where the RE is smaller than the RB. The UE calculates the CQI which may be obtained when alternately applying the channels in units of n REs.

Third Embodiment

In a third embodiment of the present invention, the UE may feed a vertical precoder (e.g., V-PMI) which will cycle in LD-CDD transmission back to the eNB and notify the eNB of a cycling resource unit (RE/RB/subband/bandwidth) of the V-PMI and a cycling pattern. A horizontal PMI which will cycle and a cycling unit are fixed similar to the existing LD-CDD.

FIG. 12 is a diagram showing an example in which a UE performs feedback to an eNB for vertical precoder cycling.

Referring to FIG. 12, UE2 reports VPMI1 and V-PMI2 which will cycle, cycling resources of RB units and a cycling pattern, in which V-PMI1 and V-PMI2 are alternately selected, to the eNB. Thereafter, the eNB applies the reported V-PMI1 and V-PMI2 according to the cycling resource unit and the cycling pattern and transmits data. In addition, the UE estimates a channel via a CSI-RS and calculates a CQI obtained when the V-PMIs are alternately applied per RB as shown in FIG. 12. The eNB may notify the UE of whether the V-PMI1 and V-PMI2, the cycling resource unit and the cycling pattern reported by the UE are applied to real transmission via DCI.

Fourth Embodiment

Figure 13:
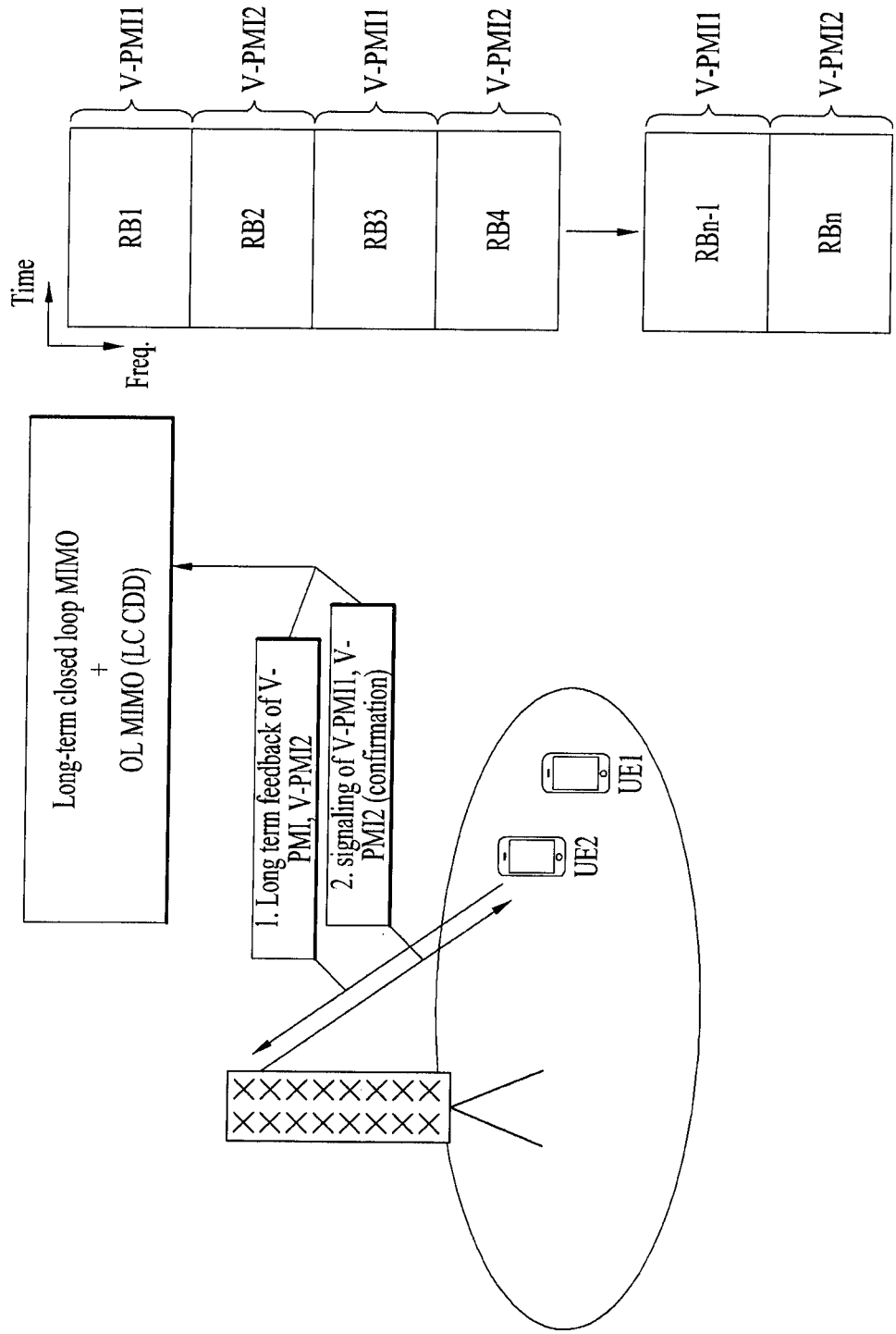
FIG. 13 is a diagram showing an example of circularly applying vertical PMIs upon calculating a CQI according to a fourth embodiment of the present invention.

The embodiments of the present invention are applicable to CRS based LD-CDD transmission. FIG. 13 is a diagram showing an example of circularly applying vertical PMIs upon calculating a CQI according to a fourth embodiment of the present invention.

Referring to FIG. 13, the UE performs channel estimation using the CRS and then feeds a plurality of vertical PMIs such as V-PMI1 and V-PMI2 having a high signal to noise ratio (SNR) back to the eNB. The PMI may be long-term feedback information having an interval of several hundred ms. The eNB sets a plurality of vertical PMIs to be used by the UE for LD-CDD reception, for example, V-PMI1 and V-PMI2, by referring to the received vertical PMIs and this may be semi-static signaling at an interval of several hundred ms. The UE estimates the channel using the CRS and then calculates an LD-CDD based CQI and RI using the vertical PMIs received from the eNB.

In CRS-based LD CDD transmission, similarly, when the number of signaled V-PMIs is N, cycling is performed again starting from V-PMI1 in units of N RBs. For example, in FIG. 13, since N=2, V-PMI1 and V-PMI2 repeatedly cycle in units of 2 RBs. Alternatively, the V-PMIs cycle in units of RBs configuring a subband. In this case, the V-PMIs may cycle in units of N RBs configuring one subband. When a V-PMI cycling unit is an RB or a subband and only one RB is scheduled to the UE, V-PMI cycling is not applied and thus diversity gain cannot be obtained using the vertical beam. Accordingly, the V-PMI may cycle in units of n REs, where the RE is smaller than the RB. The UE calculates a CQI which may be obtained when alternately applying the V-PMIs in units of n REs.

Although, in FIGS. 10 to 13, H-PMIs or horizontal channels do not cycle upon calculating the CQI for convenience of description, the H-PMIs or the horizontal channels may cycle. The H-PMIs which will cycle (or the horizontal channels which cycle) are pre-configured between the eNB and the UE and are fixed without separate signaling or feedback. For example, when H-PMI1, H-PMI2, H-PMI3 and H-PMI4 cycle, cycling may be performed in RE/RB/PRG/subband units and the cycling unit of the H-PMIs is independent of the cycling unit of the V-PMIs. When cycling is performed in RE units, H-PMIs cycle in units of n REs in each RB and, as shown in Equation 8, layer permutation may be performed by the D matrix and the U matrix per RE in n REs.

Of course, the cycling unit of the H-PMIs and the V-PMIs may be determined depending on each other. For example, when the cycling unit of the H-PMIs is N REs (that is, H-PMI1 is applied to the first N REs, H-PMI2 is applied to the next N REs and H-PMI3 is applied to the next N REs), the V-PMIs cycle in units of N*P REs which is a multiple of N. Further, when the number of cycling H-PMIs is K, the V-PMIs may cycle in units of N*K*P REs which is a multiple of N*K.

Although it is assumed that the rank of the V-PMI is 1 in the embodiments of the present invention, the present invention is applicable to rank of 2 or higher. In this case, the eNB or the UE signals the V-PMI and rank information of the V-PMI.

In addition, although, in the embodiments of the present invention, the UE or the eNB performs cycling by adaptively determining and sharing the V-PMIs, the V-PMIs may be fixed similarly to the H-PMIs in consideration of system complexity and gain. Whether V-PMI cycling is fixed and adaptive is determined by the eNB and is signaled to the UE or is determined by the UE and is signaled to the eNB.

Further, although the UE notifies the eNB of the cycling resource unit (RE/RB/PRG/subband/bandwidth) and the cycling pattern in the embodiments of the present invention, particularly, in the third embodiment, the eNB may notify the UE of this information.

Figure 14:
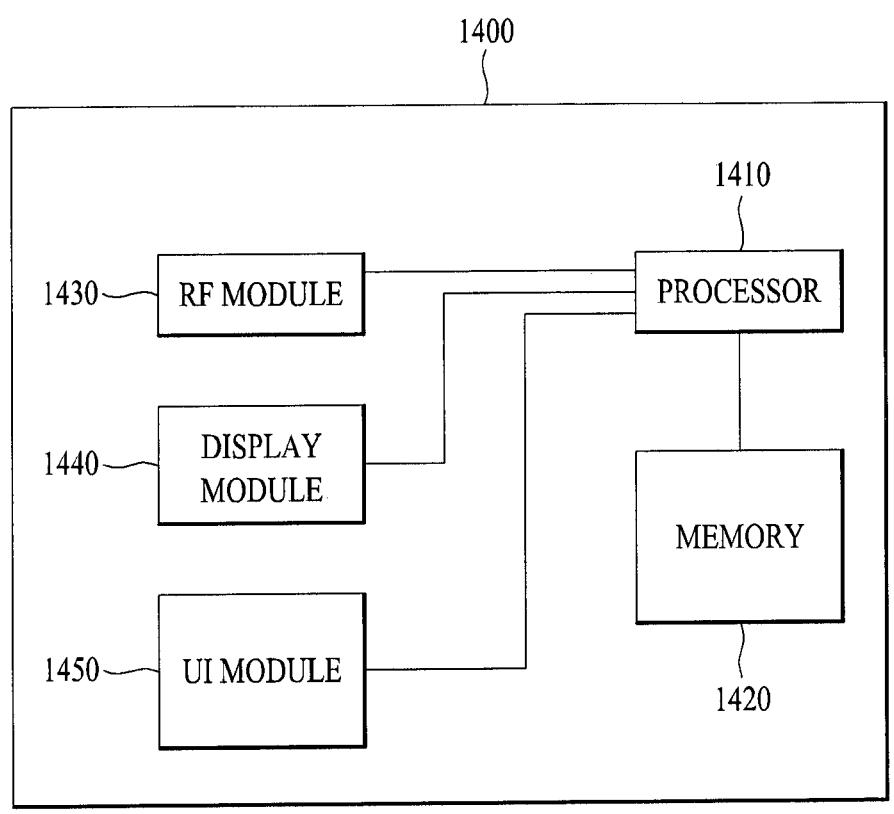
FIG. 14 is a block diagram of a communication apparatus according to an embodiment of the present invention.

FIG. 14 is a block diagram of a communication apparatus according to an embodiment of the present invention.

Referring to FIG. 14, a communication apparatus 1400 includes a processor 1410, a memory 1420, an RF module 1430, a display module 1440, and a User Interface (UI) module 1450.

The communication device 1400 is shown as having the configuration illustrated in FIG. 14, for the convenience of description. Some modules may be added to or omitted from the communication apparatus 1400. In addition, a module of the communication apparatus 1400 may be divided into more modules. The processor 1410 is configured to perform operations according to the embodiments of the present invention described before with reference to the drawings. Specifically, for detailed operations of the processor 1410, the descriptions of FIGS. 1 to 13 may be referred to.

The memory 1420 is connected to the processor 1410 and stores an Operating System (OS), applications, program codes, data, etc. The RF module 1430, which is connected to the processor 1410, upconverts a baseband signal to an RF signal or downconverts an RF signal to a baseband signal. For this purpose, the RF module 1430 performs digital-to-analog conversion, amplification, filtering, and frequency upconversion or performs these processes reversely. The display module 1440 is connected to the processor 1410 and displays various types of information. The display module 1440 may be configured as, not limited to, a known component such as a Liquid Crystal Display (LCD), a Light Emitting Diode (LED) display, and an Organic Light Emitting Diode (OLED) display. The UI module 1450 is connected to the processor 1410 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a method and apparatus for reporting channel quality information for three-dimensional (3D) multiple input multiple output (MIMO) in a wireless communication system to a 3GPP LTE system is described, the present invention is applicable to various wireless communication systems in addition to the 3GPP LTE system.

The invention claimed is:

1. A method of reporting channel quality information for three-dimensional (3D) multiple input multiple output (MIMO) transmission to a base station at a user equipment (UE) in a wireless communication system, the method comprising:
   receiving, from the base station, configuration information about a first reference signal beamformed based on a first vertical precoder and a second reference signal beamformed based on a second vertical precoder;
   measuring a first channel by using the first reference signal that is beamformed based on the first vertical precoder and measuring a second channel by using the second reference signal that is beamformed based on the second vertical precoder;
   determining a size of a beamforming resource unit in a frequency domain, based on a size of the allocated bandwidth;
   calculating the channel quality information for a bandwidth allocated to the UE on the assumption that the first channel measured by the first beamformed reference signal and the second channel measured by the second beamformed reference signal are received simultaneously in the time domain and are received cyclically in the frequency domain per the beamforming resource unit within the bandwidth allocated to the UE; and
   reporting the calculated channel quality information to the base station,
   wherein, when the size of the allocated bandwidth is equal to or greater than two resource blocks, the size of a beamforming resource unit is one resource block,
   wherein, when the size of the allocated bandwidth is equal to one resource block, the size of a beamforming resource unit is a specific number of resource elements, and
   wherein the specific number of resource elements is less than a number of resource elements which are included in the one resource block.

2. The method according to claim 1, wherein calculating the channel quality information comprises:
   calculating the channel quality information, on the assumption that different horizontal precoders are cyclically applied per the beamforming resource unit within the allocated bandwidth.

3. A user equipment (UE) in a wireless communication system comprising:
   a wireless communication module; and
   a processor connected to the wireless communication module,
   wherein the processor controls the wireless communication module to:
      receive, from a base station, configuration information about a first reference signal beamformed based on a first vertical precoder and a second reference signal beamformed based on a second vertical precoder,
      measure a first channel by using the first reference signal that is beamformed based on the first vertical precoder and measure a second channel by using the second reference signal that is beamformed based on the second vertical precoder,
      determine a size of a beamforming resource unit in a frequency domain, based on a size of the allocated bandwidth,
      calculate the channel quality information for a bandwidth allocated to the UE on the assumption that the first channel measured by the first beamformed reference signal and the second channel measured by the second beamformed reference signal are received simultaneously in the time domain and are received cyclically in the frequency domain per the beamforming resource unit within the bandwidth allocated to the UE, and
      report the calculated channel quality information to the base station,
   wherein, when the size of the allocated bandwidth is equal to or greater than two resource blocks, the size of a beamforming resource unit is one resource block,
   wherein, when the size of the allocated bandwidth is equal to one resource block, the size of a beamforming resource unit is a specific number of resource elements, and
   wherein the specific number of resource elements is less than a number of resource elements which are included in the one resource block.

4. The UE according to claim 3, wherein the processor calculates the channel quality information, on the assumption that different horizontal precoders are cyclically applied per beamforming resource unit within the allocated bandwidth.

* * * * *